United States Patent

Mills

[15] 3,646,368
[45] Feb. 29, 1972

[54] CHECKING FOR UNDESIRABLE MULTIPLICITY OF MATRIX PATHS

[72] Inventor: Jeffrey P. Mills, Maywood, Ill.

[73] Assignee: Automatic Electric Laboratories, Inc., Northlake, Ill.

[22] Filed: July 9, 1970

[21] Appl. No.: 53,354

[52] U.S. Cl. ............................. 307/269, 328/151, 324/51, 340/411, 179/18 GF
[51] Int. Cl. ............................. G01r 31/02, H04m 3/26
[58] Field of Search ............ 324/51; 328/151; 340/411, 214; 179/18 AB, 18 GF, 175.3; 307/269

[56] References Cited

UNITED STATES PATENTS

| 2,814,774 | 11/1957 | Wong | 324/51 |
|---|---|---|---|
| 3,412,392 | 11/1968 | Jenkins et al. | 324/51 |
| 1,745,419 | 2/1930 | Henneberger | 324/51 |
| 2,955,237 | 10/1960 | Wyndham | 324/51 |
| 3,328,683 | 6/1967 | Davenport et al. | 324/51 |
| 3,247,325 | 4/1966 | Han et al. | 179/18 AB |

*Primary Examiner*—John S. Heyman
*Assistant Examiner*—Harold A. Dixon
*Attorney*—Cyril A. Krenzer, K. Mullerheim, B. E. Franz and Glenn H. Antrim

[57] ABSTRACT

Whether a selected operating path has an undesirable multiple circuit is determined before operating current is applied by rapidly sampling the voltage level across a selected operating path at a predetermined time after constant current, less than that required for operation, is applied to it. When the path is good, voltage across it at the sampling time is substantial, but when a multiple circuit decreases the inductive impedance normally provided by operating windings, the voltage is decreased. To provide the tests, a constant-current generator and a level sensor are momentarily connected to the selected operating circuit. Logic circuits receive the output of the level sensor and decide the condition of the selected path.

5 Claims, 2 Drawing Figures

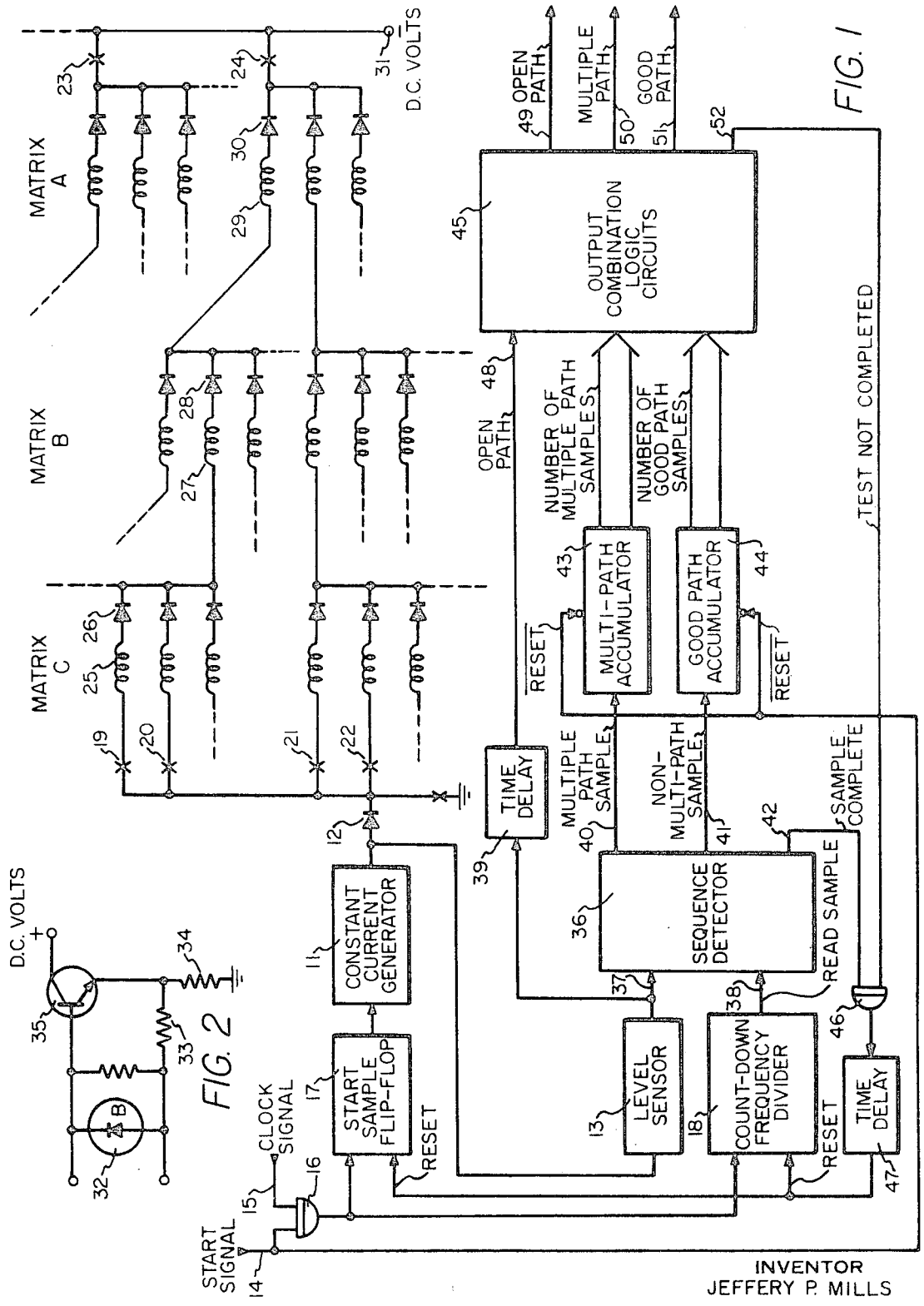

3,646,368

CHECKING FOR UNDESIRABLE MULTIPLICITY OF MATRIX PATHS

BACKGROUND OF THE INVENTION

This invention pertains, to test circuits in common-control switching systems and particularly to circuits that test for undesirable multiple paths in the operating circuits of switching matrices.

Communication systems that have switching matrices controlled by common electronic logic circuits, require means for testing different paths through the matrices before operating circuits function to complete communication paths through them. The tests are required to prevent cross connection of subscribers who have not been called.

A typical system in which such tests are required includes cascaded matrices of reed relays, common-control circuits, and marker circuits, the marker circuits being responsive to signal pulses from the electronic, common-control circuits to select and to control paths through the matrices. Typically, the relay matrices complete through their operated contacts a two-wire communication path and a "hold" lead. Windings on the relays of the matrices are connected in operating or "pull" circuits and in "hold" circuits.

In U.S. Pat. No. 3,480,735 issued to Donald A. Mnichowicz et al. on Nov. 25, 1969, a circuit for testing the "hold" path rather than the operating path is described. The switching circuits described in that patent are typical of the switching circuits to which the present test circuits are to be applied. By referring to references cited within the description of that patent, the switching circuits can be understood in still more detail.

To test for multiple paths in operate circuits of switching matrices, prior circuits relied upon testing the resistance of the paths. The testing of resistance is too slow for use with fast-operating electronic, switching circuits, the measurement of resistance being delayed until after cessation of change of current resulting from the inductance of the windings in the circuit under test.

SUMMARY OF THE INVENTION

The inductance of the selected operating path is tested rapidly to decide whether a fault in the system has caused another path to be connected in multiple with a portion of the selected path. The equipment that is used to test for multiplicity is also used with little modification to test continuity of the operating path. After an operating path of switching matrices has been selected, but before a circuit for supplying sufficient power to operate the matrices has been closed, the test is made for a multiple path to decide whether the operating path should be closed. To perform the test, a constant-current generator and a level sensor are connected to the path, and a detector is connected to the sensor to sample a reading at a predetermined time after start of the flow of constant current. The time for sampling is related to the level of the constant current and to the inductance of a good path. The sample is taken just before the current through the winding of a selected good path has built up to a constant value and therefore just before the path appears as a low impedance to the source of constant current. For a good path, the sensor provides an output responsive to the presence of substantial voltage, and providing a subsequent continuity test is good, a command is given to complete the operating circuit to the selected path. However, when a multiple path is encountered, the impedance offered by the path has decreased to such a low value by the time output of the level detector is sampled that a power voltage is present, and after repeated tests are performed automatically to verify the test results as described below, a command is given to indicate trouble causing a multiple path.

Logic circuits connected to the level sensor decide whether to provide a signal indicating a good path or a signal indicating a multiple path. If the duration of changing current is sufficiently long to provide an indication of non-multiple path on a first sample, and if the flow of current in the path subsequently becomes constant to show continuity, a signal for a good path is provided at the output of the logic circuit. However, when the first sample indicates a multiple path, additional samples are taken in rapid succession to eliminate error that might have been caused by noise. When the samples show an absence of multiplicity for a sufficient number of times, the logic circuit provides an indication of a good path.

BRIEF DESCRIPTION OF THE DRAWING

FIG. 1 is a block diagram of the test circuit of this invention connected to an abbreviated schematic diagram of switching matrices; and FIG. 2 is a schematic diagram of the level sensor of FIG. 1.

DESCRIPTION OF THE PREFERRED EMBODIMENT

In FIG. 1, a constant-current generator 11 is connected through an isolating diode 12 and marking control contacts to operating circuits of matrices, A, B, and C. A level sensor 13 has an input circuit connected to the output circuit of the constant-current generator 11 and an output connected to the input of logic circuits that determine whether a selected operating circuit is good before applying operating power to it. A start signal is applied to a conductor 14, and a clock signal is applied to a conductor 15. These signals determine when to start applying constant current to the selected operating circuit of the matrices and when to sample the output of the level sensor 13 for application to the logic circuits that decide the condition of the path.

In detail, the conductor 14 to which a start signal is applied and the conductor 15 to which a clock signal is applied are connected to respective inputs of an AND-circuit 16. The output of the AND-circuit 16 is connected to the circuit for setting a flip-flop 17, and it operates in response to the application of signals to both of the conductors 14 and 15 to start a first phase of a test that may require a series of samples. The output of AND-circuit 16 is also connected to the circuit for setting a frequency divider 18 and when the start signal and the clock signal are both applied to the frequency divider, it counts to provide a read-sample signal at a predetermined time after the test current is supplied to a selected operating circuit of the matrices.

Just before the start signal is applied to the conductor 15, the marking circuits (not shown) of the switching system have operated to close a certain one of the contacts represented by the contacts 19–22 and certain one of the contacts represented by the contacts 23 and 24 for selecting a particular operating circuit. For example, when contacts 19 and 24 have been operated, a circuit can be traced from the output of the constant-current generator 11 through the isolating diode 12, the operated contacts 19, and the operating winding 25 contained in matrix C, the diode 26, the winding 27 in the matrix B, the diode 28, the winding 29 in the matrix A, the diode 30, the operated contacts 24, to the terminal 31 connected to a source of negative direct-current voltage. Current control means is provided in the constant-current circuit to adjust the level of current required according to the inductive characteristic of the operating circuits being selected and according to the predetermined time between application of the constant current and the sampling of the voltage across the operating circuit.

Referring to FIG. 2, a breakdown diode 32 of the level sensor 13 is effectively connected across the output of the constant-current generator 11. After the start of the constant-current generator but before the current is fully built up through the windings of the selected operating circuit of the matrices, a substantial amount of the current passes through the breakdown diode 32 and it limits the voltage applied to the operating circuit to the breakdown voltage of the diode. Since this voltage is considerably below the operating voltage for the switching elements of the matrices, and since the duration of the test is short, the switches have little tendency to operate during the testing interval. The base-emitter circuit of the transistor 35 and the bias resistor 33 are also connected across the breakdown diode 32. Resistors 33 and 34 comprise a voltage divider for applying bias necessary for normally cutting off the transistor 35. At the beginning of the application of constant current to the operating circuit of the matrices, the voltage across the breakdown diode 32 is sufficient to cause it to break down, and the breakdown voltage reverses the bias applied to the emitter-base circuit of the transistor 35 applied by the resistor 33. During application of the breakdown voltage, the transistor becomes conductive and its output is a binary 0. As the current through the windings of the selected operating circuit of the matrices approaches a steady state, the operating circuit becomes a low-resistance circuit across the breakdown diode 32, and the shunting low-resistance circuit decreases the voltage applied to the base-emitter circuit of the transistor 35 to a value substantially less than the reverse bias voltage applied by the resistor 33 and causes the transistor 35 to become nonconductive. When the transistor is nonconductive a binary 1 is present at the output of the level sensor 13.

The output of the level sensor 13 is connected to the input 37 of a sequence detector 36 and to the input of a time delay circuit 39. The output of the frequency divider 18 is connected to a read-sample input 38 of the sequence detector 36. When a start signal is applied to the input conductor 14, the frequency divider 18 counts until a desired predetermined interval, for example, 128 microseconds, has been measured, and it then changes its output from a binary 0 to a binary 1. When the signal changes to 1, the sequence detector 36 is operated to its sampling state.

A sequence detector 36 is a combination of usual logic circuits to provide results as shown in the following state table:

SEQUENCE DETECTOR.—STATE TABLE

| Typical Entry: | | PCC (37) | RS (38) | | | | |
|---|---|---|---|---|---|---|---|
| | A011 | | | | | | |
| Next State | | | | | | | |
| MPS Output (40) | | 0 | 0 | 0 1 | 1 0 | 1 1 | |
| NMS output (41) | | | | | | | |
| SC Output (42) | A | —000 | | A011 | B101 | A011 | |
| | B | —000 | | A011 | B101 | B101 | |

The first number in the heading of each of the four columns is the path current-constant signal applied to the input conductor 37 of the sequence detector 36 from the output of the level sensor 13, and the second number of each column heading is the read-sample signal applied to the input conductor 38 of the sequence detector 36 from the frequency divider 18. The designations A and B for the two rows of the table are the two possible internal states of the sequence detector 36. At the beginning of each sample, both the path-current-constant signal applied to the input conductor 37 and the read-sample signal applied to the input conductor 38 are 0, the state of the sequence detector is indeterminate and the output of each of its output conductors is O which is indicated by the entries "—000" in the 00 column of the state table.

Assuming that a non-multiple path is being sampled, the read-sample signal applied to the conductor 38 of the sequence detector changes to 1 while the path current-constant signal applied to the input conductor 37 is still 0. The operation of the sequence detector in this case is defined by the "A011" entries in the 01 column of the table, as follows. Regardless of whether the state of the sequence detector has been A or B, the new state of the detector will be A, which is indicated by the A designation in each row of the 01 column of the table. The 0 indicates that a multiple-path signal is not applied to the conductor 40, the 1 in the third place indicates that a nonmultiple signal is applied to the conductor 41, and the last 1 indicates that a sample-complete signal is applied to the conductor 42.

In all instances, except when the selected path is open, both the path-current-constant signal and the read-sample signal finally become 1 as shown in the column designation for the last column of the table; and when no multiple path is present, the state of the detector and its outputs have been set according to the 01 column, the state of the detector continues to be A; and the outputs of the detector remain the same according to the 11 column for the state A. On the other hand, when the path being tested has a multiple connection, the path-current-constant signal applied to the conductor 37 becomes 1 before the read-sample signal 1 is applied to the conductor 38, the detector 36 has an intermediate state B and outputs according to the 10 column of the table; that is, the detector has changed from an indeterminate state with all outputs being 0 as shown in the 00 column to the state B with outputs as shown in the 10 column. Finally, in this example for a multiple path, the read-sample signal becomes 1, the state of the detector is still B, and its outputs are still "101" as represented by "B101" shown in the B row of the 11 column of the table. Therefore, as the detector remains in the state B, a 1 is applied to the conductor 40 to indicate a multiple path has been detected, the signal on the conductor 41 for a non-multiple path is O, and a 1 is applied to the conductor 42 to indicate that the sample is completed.

Except when the first sample shows that a multiple path does not exist, the number of multiple-path samples and the number of good-path samples are accumulated, and providing a predetermined number of good-path samples are recorded, a good-path indication is given in spite of detection of one or two multiple-path samples that might have been caused by noise. The output conductors 40 and 41 of the sequence detector 36 for indicating a multiple condition of a selected path are connected to the inputs of accumulators 43 and 44 respectively. The accumulators are reset by other inputs connected to the input conductor 14 to which start signal is applied. The start signal is inverted at the input of the accumulators 43 and 44 so that when the start signal changes to a O at the end of a test interval, the accumulators are reset. An appropriate number of output conductors are connected from each of the accumulators 43 and 44 to the input of output combination logic circuits 45 that make a final decision as to whether a path is good.

In a typical system, the multiple-path accumulator 43 has seven states so that up to three indications of multiple paths can be recorded when testing a selected operating path, and the good-path accumulator 44 has 15 states of operation so that up to seven good paths can be recorded while testing a selected path. The multiple-path accumulator 43 is conventional and is designed to satisfy the following state table:

MULTIPLE-PATH ACCUMULATOR.—STATE TABLE

| Typical Entry: | | E2 | | MPS (40) | START (14) | | | |
|---|---|---|---|---|---|---|---|---|
| Next State | | | | | | | | |
| No. of Multiple | | | | | | | | |
| Path Samples | | | | 0 | 0 | 0 1 | 1 0 | 1 1 |
| | | A | | A0 | A0 | ------- | B0 | |
| | | B | | A0 | C1 | ------- | B0 | |
| | | C | | A0 | C1 | ------- | D1 | |
| | | D | | A0 | E2 | ------- | D1 | |
| | | E | | A0 | E2 | ------- | F2 | |
| | | F | | A0 | G3 | ------- | F2 | |
| | | G | | A0 | G3 | ------- | | |

The first number in the heading of each column of the table is the multiple-path-sample signal (MPS) that is applied to input conductor 40 of the accumulator 43, and the second number in each heading is start signal having its complement used as the reset signal of the accumulator. The designations A through G for the rows indicate seven possible states of the accumulator. The first or 00 column shows that whenever the start signal is 0, the accumulator is reset to state A; and the 10 column has no meaning because a sample cannot be obtained without a start signal.

The operation of the multiple-path accumulator 43 can best be understood by describing briefly its operation when a series of multiple-path-sample signals are applied to it. The start signal that is applied to the conductor 14 persists until the test for a selected path is completed. This test may require several readings from the level sensor 13 during successive internals determined by the clock signal applied to the conductor 15. After the start signal is applied, the clock signal starts both the constant-current generator 11 and the frequency divider 18; and after a predetermined count by the divider, the output of the level sensor 13 is applied to the input 37 of the sequence detector 36. Assuming that the selected path has a multiple circuit, the level sensor 13 will have an output of 11 while the countdown frequency divider 18 still has an output of 0. When the first path-current-constant 1 is applied by conductor 37 to the input of the sequence detector 36, the multiple-path sample applied to the output conductor 40 of the sequence detector 36 changes from 0 to 1, as previously described, for application to the multiple-path accumulator 43.

The multiple-path accumulator 43 had been previously reset to a state A when the start signal was 0 before the beginning of the test as shown in the OO column of the multiple-path accumulator table above. The state of the accumulator after the start of the test, but before the level sensor 13 has been sampled, is shown in the O1 column and in the A row as "A0." When the multiple-path sample changes to a 1 as shown in the 11 column, the state of the multiple-path accumulator changes from the state A to the state B. Since this sample is now completed, a signal is applied to the conductor 42 at the output of the sequence detector 36, and when a test-not-completed signal is applied from the output combination logic circuits 45 to the AND-circuit 46, a signal is applied through the time delay circuit 47 to the reset inputs of the start-sample flip-flop 17 and to the frequency divider 18.

When the read-sample signal was removed from the input 38 of the sequence detector 36, the sequence detector operated to remove the 1 from the conductor 40 that applies multiple-path samples from the detector to the multiple-path accumulator 43. Referring again to the 11 column and the A row of the multiple-path accumulator table, the "B" indicates that the accumulator has changed to state B, and the "0" indicates that the accumulator still displays an output of 0. When the read-sample signal is removed from the conductor 38 of the sequence detector 36 as described above, the signal on the multiple-path sample conductor 40 returns to 0 as shown in the 01 column, and since the state of the multiple-path accumulator 43 is B before the change of signal, the state changes to C as shown in the B row and the 01 column and the output changes to 1. In a like manner, when a succeeding sample is provided for the same test, and a multiple path is indicated, the state of the accumulator changes to D while a 1 is still displayed, and then when the 1 is removed from the conductor 40 at the output of the sequence detector 36, the state of the accumulator 43 changes to E, and it displays an output of 2 for application to the output combination logic circuits 45. In a like manner, a third multiple path can be detected.

When the level sensor 13 indicates that substantial voltage still exists across the selected path when the read-sample signal is applied to the sequence detector 36, a 1 is applied to the conductor 41 of the sequence detector 36 for applying a nonmultiple-path-ample signal to the good-path accumulator 44. Other than being able to accumulate a greater number of samples, the accumulator 44 operates in a manner similar to that described for accumulator 43. When the test is completed as described subsequently, the start signal changes state and is inverted to reset the accumulators 43 and 44.

Shortly after the first reading for applying a 1 to the good-path accumulator 44, the test is made to determine if the selected path is open. For example, when the path does not contain a multiple circuit, substantial voltage is still applied to the input of the level sensor 13 when its output is read by the sequence detector 36. Shortly thereafter the input to the level sensor will decrease to a very low value if the selected path is not open. When the path is not open and substantial voltage is applied to the input of the level sensor 13, the duration of the pulse at its output is too short to pass through the time delay 39, and no signal is applied to the conductor 48 connected to the input of the output combination logic circuits 45. However, when the voltage persists because the selected path is open, the time delay 39 passes a signal to cause the combination logic circuits 45 to indicate an open path.

The combination logic circuits 45 operate in response to signals indicating whether the selected path is open or closed, the number of multiple-path samples, and the number of good-path samples. Its output commands the selecting circuits either to apply operating current to the selected path and complete a switching circuit through the matrices, or indicate trouble in the system due to a multiple path. When a first sample shows a good path, the application of signal to the output conductor 51 is delayed slightly until a test is made for an open path according to the signal applied to the input conductor 48. If the path tested is not open, a signal is then applied to the conductor 51 to indicate that the path is good; a signal is not applied to the conductor 52 that furnishes reset signals for taking additional samples during the test of this selected path. Obviously, when the test shows that the path is open, signal is applied to the output conductor 49 to indicate that the path is open and that trouble in the switching system should be indicated, and again signal is not applied to conductor 52 because additional samples are not required.

If a multiple-path indication is encountered while making the first sample, signal is applied to the output conductor 52 to indicate that the test is not completed, and the test circuits operate in response to application of this signal to repeat the sampling rapidly. In one system, if the number of samples for a good path predominates over the number of samples for a multiple path according to the following description, a signal is applied to the output conductor 51 to indicate that the path is good. Otherwise signal is applied to the conductor 50 to show that the path includes a multiple circuit.

When the first sample shows that the path does not include a multiple circuit and the path is not open, a signal is applied to the conductor 51 to show a good path and a signal is withheld from the conductor 52 to show that the test is completed. When the multiple path is shown during the first sample, signal is withheld from the conductors 50 and 51, but a signal is applied to the conductor 52 in order that the sampling will be repeated to complete the test for the selected conductor. If only the first sample shows a multiple path and each one of four additional samples shows a non-multiple path, a signal is applied to the conductor 51 to indicate a good path. However, if a second multiple-path sample is encountered while testing to obtain the four good-path samples, the sampling continues and if a total of seven samples of good paths are then encountered before a third multiple-path sample is encountered, a signal is likewise applied to the conductor 51 for indicating a good path. Whenever a third multiple path is encountered, signal is immediately applied to the conductor 50 to indicate a multiple path, and signal is withheld from the conductor 52 so that the sampling will not be repeated.

The design of the combination logic circuits 45 is conventional according to the output table shown below.

The duration of the start signal that is applied to the input conductor 14 is sufficient to permit the maximum required number of samples. The sample is repeated to complete the test when a signal is applied to both the conductor 42 of the sequence detector and the conductor 52 of the output combination logic circuits. These signals reset the flip-flop 17 and the frequency divider 18 to start a new sample in the manner described above. At the end of the test for any operating circuit of the matrices, the start-sample flip-flop 17 and the frequency divider 18 are reset in response to the removal of the start signal from the conductor 14. The selection of a new path to be tested and the application of the start signal 14 is then determined by the common control circuits of the switching system.

COMBINATION LOGIC OUTPUT TABLE

| Inputs | | | Outputs | | | |
|---|---|---|---|---|---|---|
| Open path (48) | Number of multiple path samples (43) | Number of good path samples (44) | Open path (49) | Multiple path (50) | Good path (51) | Test not completed (52) |
| 0 | 0 | 0 | 0 | 0 | 0 | 1 |
| 0 | 0 | 1 | 0 | 0 | 1 | 0 |
| 0 | 0 | 2 | — | — | — | — |
| 0 | 0 | 3 | — | — | — | — |
| 0 | 0 | 4 | — | — | — | — |
| 0 | 0 | 5 | — | — | — | — |
| 0 | 0 | 6 | — | — | — | — |
| 0 | 0 | 7 | — | — | — | — |
| 0 | 1 | 0 | 0 | 0 | 0 | 1 |
| 0 | 1 | 1 | 0 | 0 | 0 | 1 |
| 0 | 1 | 2 | 0 | 0 | 0 | 1 |
| 0 | 1 | 3 | 0 | 0 | 0 | 1 |
| 0 | 1 | 4 | 0 | 0 | 1 | 0 |
| 0 | 1 | 5 | — | — | — | — |
| 0 | 1 | 6 | — | — | — | — |
| 0 | 1 | 7 | — | — | — | — |
| 0 | 2 | 0 | 0 | 0 | 0 | 1 |
| 0 | 2 | 1 | 0 | 0 | 0 | 1 |
| 0 | 2 | 2 | 0 | 0 | 0 | 1 |
| 0 | 2 | 3 | 0 | 0 | 0 | 1 |
| 0 | 2 | 4 | 0 | 0 | 0 | 1 |
| 0 | 2 | 5 | 0 | 0 | 0 | 1 |
| 0 | 2 | 6 | 0 | 0 | 0 | 1 |
| 0 | 2 | 7 | 0 | 0 | 1 | 0 |
| 0 | 3 | 0 | 0 | 1 | 0 | 0 |
| 0 | 3 | 1 | 0 | 1 | 0 | 0 |
| 0 | 3 | 2 | 0 | 1 | 0 | 0 |
| 0 | 3 | 3 | 0 | 1 | 0 | 0 |
| 0 | 3 | 4 | 0 | 1 | 0 | 0 |
| 0 | 3 | 5 | 0 | 1 | 0 | 0 |
| 0 | 3 | 6 | 0 | 1 | 0 | 0 |
| 0 | 3 | 7 | — | — | — | — |
| 1 | 0 | 0 | 1 | 0 | 0 | 0 |
| 1 | 0 | 1 | — | — | — | — |
| 1 | 0 | 2 | — | — | — | — |

I claim:

1. In a switching system of the type having a switching matrix with a plurality of branching paths, each of said paths including inductive operating winding means, selecting means operable to select a terminal at each end of said paths, the selected terminals normally terminating a signal series path, operating current means operable after operation of said selecting means to provide operating current flow in a selected path between said selected terminals, a multiple path detector comprising: a constant current generator, a voltage level sensor, connect means operated after selection of two of said terminals associated with one of said paths but before operation of said operating current means, to connnect said constant-current generator and said voltage level sensor to one of said selected terminals, current limiting means operated to limit the current flow of said constant-current generator to a level insufficient to cause operation of switches having windings in said selected path, said voltage level sensor including a parallel current circuit across said selected inductive path, whereby the current flow through said sensor decreases from a substantial amount to a smaller amount as the current through said windings builds up to a constant level, read-sample means operated at a predetermined time after the start of current flow from said constant current generator in said selected path but before the current flow in a good path becomes constant to sample said current flow through said parallel current circuit of said sensor, the current flow becoming substantially constant by said predetermined time when said selected path includes an undesirable multiple path, and said sensor including indicating means operated at said predetermined time to provide a different output indication for a good path and for a multiple path.

2. A multiple-path detector according to claim 1 in which said parallel current circuit includes a breakdown diode.

3. In a switching system as claimed in claim 1, wherein said multiple-path detector includes a time delay circuit connected to said voltage level sensor, said time delay circuit operated to prevent flow of a substantial current therethrough when said selected path is continuous such that current flow immediately after said predetermined time through said voltage level sensor is relatively small, said time delay circuit operated to conduct a substantial current after said predetermined time when said selected path is open, and means connected to said time delay circuit responsive to conduction of current flow therethrough for providing an open-path signal.

4. In a switching system having a multiple-path detector as claimed in claim 1, a multiple-path accumulator and a good-path accumulator, each having an output and an input, said inputs connected to said read-sample means, said multiple-path accumulator adding the number of said output indications for multiple path, said good-path accumulator adding said output indications for a good path, and logic circuits connected to the outputs of said accumulators, said logic circuits including first output means operated to provide an output signal indicating a good path in response to said good-path accumulator providing at least a predetermined number of output indications for a good path with respect to a predetermined smaller number of said indications for a multiple path provided by said multiple-path accumulator, and said logic circuits including second output means operated to provide a signal indicating a multiple-path in response to said multiple-path accumulator providing a number of said indications for a multiple path greather than a predetermined smaller number.

5. In a switching system having a multiple path detector as claimed in claim 4, and including a time delay circuit connected between said voltage level sensor and said logic circuits, said time delay circuit operated in response to operation of said sensor by the sustained current flow in said parallel current circuit when said selected path is open to operate, said logic circuits operated to inhibit said output signal for indicating a good path.

* * * * *